J. JOERGENS.
COLTER AND MOUNTING FOR DISK HARROWS.
APPLICATION FILED OCT. 7, 1915.
1,187,326.      Patented June 13, 1916.
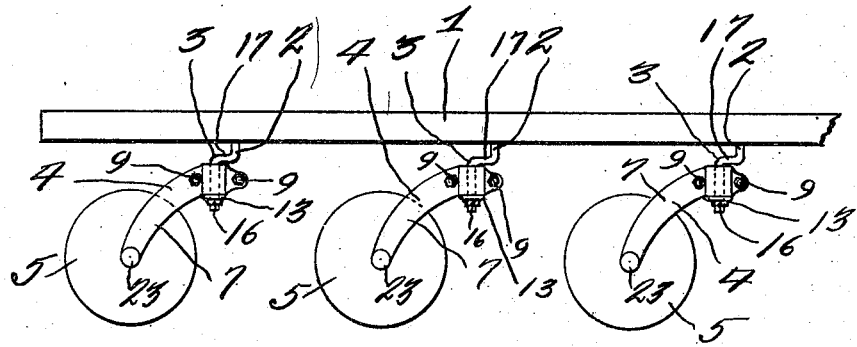
Fig. 1.
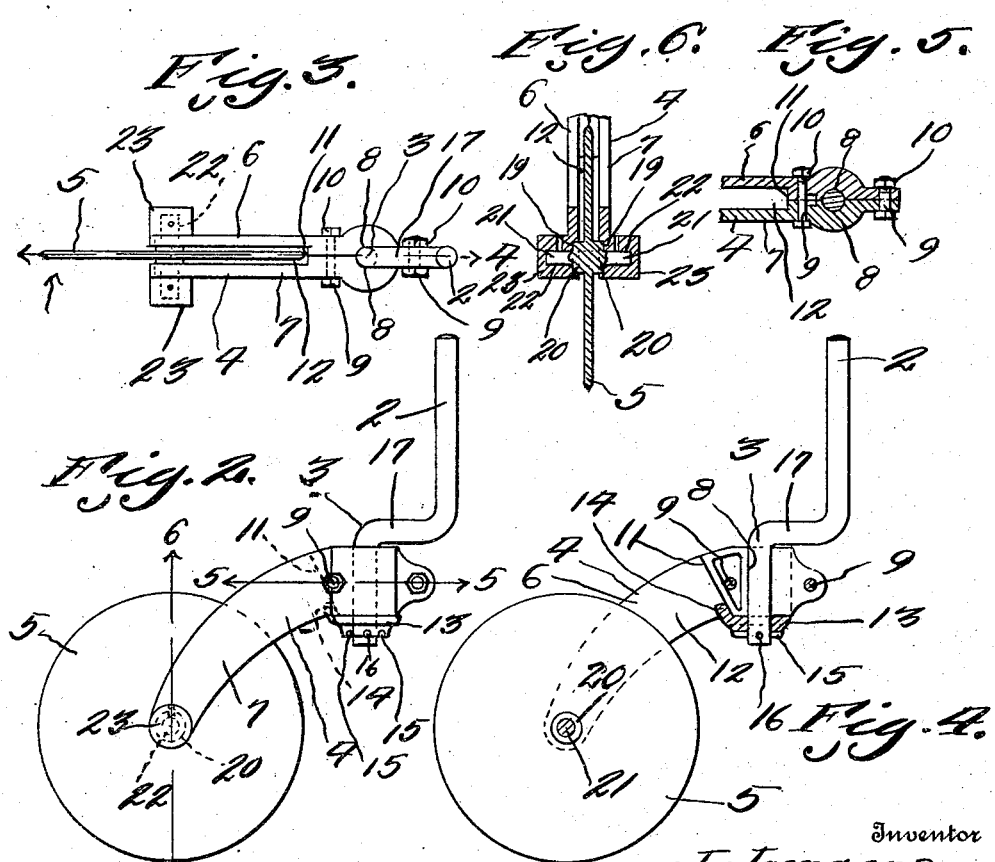
Witnesses
Inventor
J. Joergens

UNITED STATES PATENT OFFICE.

JOSEPH JOERGENS, OF NEW BADEN, ILLINOIS.

COLTER AND MOUNTING FOR DISK HARROWS.

1,187,326.  Specification of Letters Patent.  Patented June 13, 1916.

Application filed October 7, 1915. Serial No. 54,527.

*To all whom it may concern:*

Be it known that I, JOSEPH JOERGENS, a citizen of the United States, residing at New Baden, in the county of Clinton, State of Illinois, have invented a new and useful Colter and Mounting for Disk Harrows; and I do hereby declare the following to be a full, clear, and exact description of the invention, such as will enable others skilled in the art to which it appertains to make and use the same.

This invention relates to a colter and its improved mounting for a disk harrow or cultivator, and an object of the invention is to provide an improved mounting including means for setting the colter or disk at different angles.

One of the features of the invention is to provide the bracket mounting consisting of two sections clamped together upon an offset portion of a vertical stem or spindle carried by the frame of the harrow or cultivator, there being a notched washer or collar adjustably secured to said offset portion, and which washer or collar is provided with a lug extending between the two parts of the bracket, for holding the bracket in different positions.

Another feature of the invention is to provide a colter or disk having the spindle extending into bearings of the two parts, and provided with a hub fitting the depressions adjacent the two bearings of the two parts of the bracket, thereby holding the colter in position.

In practical fields the details of construction may necessitate alterations, falling within the scope of what is claimed.

The invention comprises further features and combination of parts, as hereinafter set forth, shown in the drawings and claimed.

In the drawings: Figure 1 is a view in elevation of a portion of a harrow or cultivator frame showing a plurality of colters or disks as applied thereto. Fig. 2 is an enlarged view in side elevation of one of the colters or disks. Fig. 3 is a plan view of Fig. 2. Fig. 4 is a sectional view on line 4—4 of Fig. 3. Fig. 5 is a sectional view on line 5—5 of Fig. 2. Fig. 6 is a sectional view on line 6—6 of Fig. 3.

Referring more especially to the drawings, 1 designates a part of a harrow or cultivator frame having the spindles or stems 2 carried thereon, which spindles or stems are provided with offset parts 3 extending vertically downwardly. Each of the brackets 4 which carry the colter or disk 5 is curved rearwardly and downwardly, and consists of the two parts 6 and 7. The adjacent upper portions of the two parts have their adjacent faces grooved vertically as shown at 8, to receive the offset vertical portion 3 of the spindle or stem. Where the grooves 8 receive the offset portion, and upon opposite sides of the grooves, the adjacent faces of the two parts 6 and 7 of the bracket contact, there being bolts 9 including nuts 10 for holding the two parts together. Beyond one of the bolts 9, the inner faces of the rearwardly and downwardly curved portions of the two parts of the bracket, are cut away as shown at 11, to form the crotch 12. By cutting the adjacent faces of the rearwardly and downwardly curved parts of the bracket away, said parts are made to accommodate the colter or disk 5 between the two parts. A collar or washer 13 is mounted upon the lower end of the offset portion 3 of the stem, and is provided with a lug 14 extending into the crotch 12, between the two parts of the bracket, so that whatever position the collar or washer is arranged, the bracket will assume a corresponding position. The under face of the washer or collar 13 is provided with a series of grooves or recesses 15 radiating from the center of the washer, and to hold the washer or collar in adjusted positions, a pin 16 extends transversely of the lower end of the offset part 3 of the stem, which pin 16 is designed to engage any two opposite axially registering grooves 15 of the collar or washer, so as to hold the collar or washer in adjusted position, and owing to the lug 14 extending into the crotch 12, the bracket will be held in accordance with the position of the washer.

If the bracket is adjusted so that it and the colter extend at an angle to the horizontal portion 17 of the spindle, which spindle is designed to be swiveled in any suitable manner (not shown) in the frame 1, the colter will operate at an angle to the direction of travel of the machine, thereby more efficiently cultivating the soil. In other words, the colter traveling in this manner will make a larger or wider cut, and the angle of the colter may be increased or decreased, in order to vary the width of the cut. The adjacent faces of the lower rear ends of the two parts of the bracket are provided with annular depressions 19, for the reception of the bosses 20 forming the hub of the colter or disk 5, and extending axially from the outer faces of said bosses 20 are stud pins 21 fitting the bearing 22 of the cylindrical enlargement 23 of the lower rear ends of the parts 6 and 7 of the bracket, so as to mount the colter or disk, so that it will rotate as it engages the soil, as the machine or harrow or cultivator is driven forwardly.

The invention having been set forth, what is claimed as new and useful is:—

In combination with a stem of a cultivator frame having a horizontal portion extending rearwardly and terminating in a downwardly extending vertical portion, a bracket mounted upon said downwardly extending vertical portion and curved rearwardly and downwardly, said bracket consisting of two like parts, the upper forward ends of which upon their adjacent faces being formed with grooves to receive the downwardly extending vertical portion of the stem, devices, one upon each side of the downwardly extending vertical portion and extending through said parts for clamping them together and swivelly on the vertical portion, a collar on the lower end of the vertical portion supporting the upper forward portions of said parts upon said vertical portion, said collar upon its lower face having radial grooves, a pin below the collar and extending transversely of the lower end of the vertical portion and adapted to be received in any two opposite axially alined grooves of the collar to hold the bracket in different positions and at different angles relative to the horizontal part of the stem in plan view, said bracket having a crotch, and a lug on the collar to enter the crotch, and a colter mounted in bearings of the rear lower end of the part of the bracket.

In testimony whereof I have signed my name to this specification in the presence of two subscribing witnesses.

JOSEPH JOERGENS.

Witnesses:
EMIL GIORGES,
LEONARD BERBERICH.

Copies of this patent may be obtained for five cents each, by addressing the "Commissioner of Patents, Washington, D. C."